United States Patent [19]

Krueger et al.

[11] Patent Number: 5,012,480
[45] Date of Patent: Apr. 30, 1991

[54] GAS LASER

[75] Inventors: Hans Krueger, Munich; Wolfgang Welsch, Baldham, both of Fed. Rep. of Germany

[73] Assignee: Siemens Aktiengesellschaft, Berlin and Munich, Fed. Rep. of Germany

[21] Appl. No.: 502,912

[22] Filed: Apr. 2, 1990

[30] Foreign Application Priority Data

Apr. 17, 1989 [DE] Fed. Rep. of Germany ....... 3912609

[51] Int. Cl.$^5$ .............................................. H01S 3/03
[52] U.S. Cl. ..................................... 372/61; 372/107; 372/65
[58] Field of Search .................... 372/61, 65, 107, 108; 378/98, 99

[56] References Cited

U.S. PATENT DOCUMENTS

| 4,653,063 | 3/1987 | Acharekar et al. | 372/107 |
| 4,864,582 | 9/1989 | Barth et al. | 372/107 |
| 4,890,296 | 12/1989 | Crosby | 372/107 |

Primary Examiner—Léon Scott, Jr.
Attorney, Agent, or Firm—Hill, Van Santen, Steadman & Simpson

[57] ABSTRACT

In a gas laser whose housing is composed of metal caps and a hollow tube of glass or ceramic, whereby the parts are joined with a glass solder connection have a low melting temperature, i.e. with a glass solder that contains lead borate, a durable, vacuum-tight connection is guaranteed in that the metal cap is shaped such that its free edge approaches closer to the tube at at least certain locations than does an expanded portion of the metal cap lying back from the free edge, and in that the glass solder at least partially fills the space between the expanded portion and the hollow tube.

10 Claims, 1 Drawing Sheet

GAS LASER

BACKGROUND OF THE INVENTION

1. Field of the Invention:

The present invention relates to a gas laser of the type including a housing which is composed of metal parts and of parts of glass or ceramic, in which at least one vacuum-tight transition from a metal part to a glass part or a ceramic part is provided with glass solder.

2. Description of the Prior Art

A gas laser of the type set forth above is generally disclosed in the U.S. Pat. No. 4,799,232. In that Patent, tubular glass parts and small metal tubes having end pieces of sintered glass are joined with glass solder. Such a glass solder connection, however, cannot be transferred without further measures to the joining of mechanically-stressed metal parts, particularly metal caps, to glass or ceramic parts. The solder glasses needed for a glass solder connection usually contain lead borate. As experience has shown, these solder glasses do not lead to adequately-loadable connections between glass parts and metal parts.

SUMMARY OF THE INVENTION

In a glass laser conforming to that of the type set forth above, the object of the present invention is to provide an improvement in the adhesion and in a durable, gas-tight connection between the tube of glass or ceramic and the metal cap. This object is achieved in a gas laser having a housing composed of metal parts and of glass or ceramic parts, in which at least one vacuum-tight transition from a metal part to a glass part or a ceramic part with glass solder is provided, and is particularly characterized in that the metal part is a metal cap, in that the glass solder is a glass solder which contains lead borate, and in that the metal cap is shaped such that its free edge approaches closer to the tube at least in certain locations than does an expanded part of the metal cap lying back from the free edge, and in that the glass solder at least partially fills out the space between the hollow tube and the expanded part.

According to a particular feature of the invention, the gas laser is particularly characterized in that the cap comprises a ring that overlaps the end of the tube, and in that the ring has a diameter that decreases towards its free edge.

According to another feature of the invention, the gas laser is particularly characterized in that the cap comprises a ring that overlaps the end of the tube, and in that the ring has deformations at its free end that allows its inner radius to assume different values in the circumferential direction.

According to another feature of the invention, the metal cap is composed of a NiFeCo alloy whose coefficient of thermal expansion is adapted to that of the material of the tube.

During the soldering process, the lead borate glasses dissolve the oxide on the metal surface. The adhesion between the glass solder and the metal is thereby reduced. The adhesion between the glass solder and the tube of glass or ceramic, by contrast, is not reduced and is adequate for a durable, vacuum-tight connection.

Based on the above perceptions, the features of the present invention are adequate to prevent a sliding of the metal cap on the glass solder in order to obtain a durable, vacuum-tight connection. In particular, tensile stresses in the axial direction are intercepted by the ring structure of the present invention. Such tensile stresses occur, for example, as a consequence of a mounting of the laser tube by way of the metal caps. These tensile stresses have been recognized, as a perception of the invention, as the cause for outages of laser tubes having glass solder connections. This perception enables the practice of the present invention.

The cap thereby advantageously has a ring overlapping the end of the tube, whereby the ring has a diameter that decreases towards its free end. In another advantageous embodiment, the ring has deformations at its free end that allow its inner radius to assume different values in the circumferential direction. For example, the ring can have an edge deformed in a wave-shaped manner. The structure according to the invention is particularly suitable for the utilization of metal caps composed of a nickel-iron-cobalt (NiFeCo) alloy whose coefficient of thermal expansion is adapted to that of the tube.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
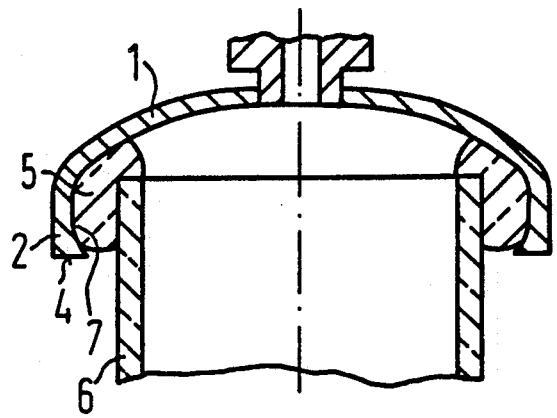
FIG. 1 is a sectional view of one end of a gas laser showing a first embodiment of the invention.

According to FIG. 1, a metal cap comprises a metal ring 2 that is edge-rolled in the region of its edge 4 and thereby extends closer to the tube 6 of glass or ceramic in the region of the edge 4. A portion 7 of the metal cap 1 lying back from the edge 4 has a larger diameter than that of the edge 4 and limits a space between the metal ring 2 and the glass or ceramic tube 6. This space is at least partially filled with glass solder 5. The glass solder 5 is composed of solder glass containing lead borate and adheres durably and in a vacuum-tight manner to the tube 6 and is prevented from separating in the axial direction by the edge-rolled free edge 4. A vacuum-tight connection to the cap 1 as well is thereby guaranteed.

Figure 2:
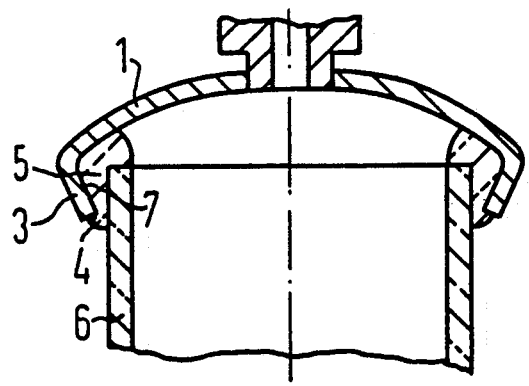
FIG. 2 is a sectional view of one end of a gas laser showing a second embodiment of the invention.

Referring to FIG. 2, the metal cap 1 has a metal ring 3 that is shaped to taper towards its free-edge 4, this profile being essentially fashioned like a truncated cone. The ring 3 also prevents a dislocation of the cap in the axial direction. In both instances, the glass solder 5 fills out the space between the expanded part 7 and the tube 6 to such an extent that a dislocation of the cap in both axial directions, i.e. upwardly as well as downwardly, is prevented.

Figure 3:
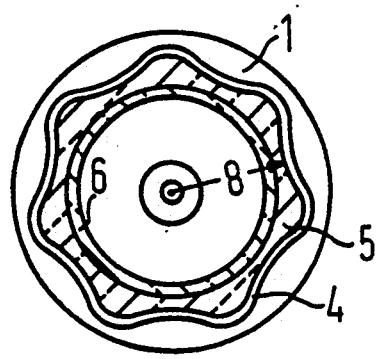
FIG. 3 is a sectional view taken transversely across a gas laser and showing a third embodiment of the invention.

Referring to FIG. 3, a cross sectional view through a further illustrated example of a gas laser constructed in accordance with the present invention is illustrated. The tube 6 of glass or ceramic appears here in a sectional view, whereas the glass solder 5 and the metal cap 1 appear in a plan view. The glass solder 5 is shown hatched. In this example, the edge 4 of the metal cap 1 is deformed in a wave-like manner, so that different values for the radius 8 of the edge 4 of the metal cap are formed in the circumferential direction. This embodiment of the invention can be produced in a simple manner from existing metal caps in that a subsequent deformation is carried out in the edge region. Here, also, the metal cap 1 is fixed in the axial direction by the solder 5 in that the solder 5 at least partially fills out an expanded space lying back from the edge 4.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a gas laser device of the type in which a hollow tube of a material selected from the group consisting of glass and ceramic is closed at one end with a cap which is soldered to the tube, the improvement for providing improved adhesion of the solder and a durable gas-tight connection between the tube and the cap, wherein:

the cap is metal and comprises an end portion over and covering the one end of the tube and a shaped portion extending from said end portion over a portion of the tube adjacent the one end of the tube, said shaped portion including a free edge and a marginal section extending between said end portion and said free edge, said free edge lying closer to the tube than said marginal section; and the glass solder comprises lead borate and fills the space between the shaped portion and the end portion of the tube.

2. The improved gas laser device of claim 1, wherein: said marginal section of said shaped portion is a ring including an inner diameter, and said free edge includes an inner diameter that is less than said inner diameter of said ring.

3. The improved gas laser device of claim 11, wherein:
said marginal section of said shaped portion tapers towards said hollow tube.

4. The improved gas laser device of claim 1, wherein:
said marginal section of said shaped portion comprises a ring including deformations which locate said free edge closer to said hollow tube at at least certain circumferential locations.

5. The improved gas laser device of claim 1, wherein: said shaped portion comprises a wave-shaped structure.

6. The improved gas laser device of claim 1, wherein:
said cap comprises a NiFeCo alloy having a coefficient of thermal expansion matched to the coefficient of thermal expansion of the material of said hollow tube.

7. In a gas laser of the type in which a hollow tube of a material selected from the group consisting of glass and ceramic is closed at one end with a cap which is soldered to the tube, an improvement for providing improved adhesion of the solder and a durable gas-tight connection between the tube and the cap, wherein:

the cap comprises a NiFeCo alloy and comprises an end portion over the one end of the tube and a ring-shaped portion including an inner diameter and extending from said end portion to lie over a portion of the tube adjacent the one end of the tube and terminated by a free edge which includes an inner diameter that is less than the inner diameter of said ring-shaped portion so as to lie closer to the tube than said ring-shaped portion between said free edge and said end portion; and the glass solder comprises lead borate and fills the space between the ring-shaped portion and the end portion of the tube.

8. The improved gas laser of claim 7, wherein:
said ring-shaped portion is a tapered portion which tapers from said end portion towards and is terminated by said free edge.

9. In a gas laser device of the type in which a hollow tube of a material selected from the group consisting of glass and ceramic is closed at one end with a cap which is soldered to the tube, an improvement for providing improved adhesion of the solder and a durable gas-tight connection between the tube and the cap, wherein:

the cap comprises a NiFeCo alloy and comprises an end portion over the one end of the tube and a shaped portion extending from said end portion over a portion of the tube adjacent the one end of the tube, said shaped portion including and terminated by a free edge, said shaped portion also including spaced circumferential deformations which locate said free edge at said deformations closer to the tube than the undeformed locations of said free edge; and the glass solder comprises lead borate and fills the space between the shaped portion and the end portion of the tube.

10. The improved gas laser device of claim 9, wherein: said shaped portion is a wave-shaped portion including said deformations.

* * * * *